United States Patent [19]

Perzley et al.

[11] Patent Number: 4,823,279
[45] Date of Patent: Apr. 18, 1989

[54] COORDINATE CONVERSION SYSTEM AND METHOD FOR CONTROLLING AN INDUSTRIAL ROBOT

[75] Inventors: William Perzley, Weston; Rajan C. Penkar, Danbury, both of Conn.; Jeffrey R. Davis, Sunnyvale, Calif.

[73] Assignee: Unimation, Inc., Danbury, Conn.

[21] Appl. No.: 834,204

[22] Filed: Feb. 27, 1986

[51] Int. Cl.[4] .................. G06F 15/50; B25J 17/02; G05B 19/42
[52] U.S. Cl. .................. 364/513; 364/191; 364/731; 901/15; 901/29
[58] Field of Search .................. 364/191-193, 364/474, 475, 513, 731; 414/730; 901/30, 29, 15

[56] References Cited

U.S. PATENT DOCUMENTS

| | | | |
|---|---|---|---|
| 4,506,335 | 3/1985 | Magnuson | 364/513 |
| 4,580,229 | 4/1986 | Koyama et al. | 364/513 |
| 4,621,332 | 11/1986 | Sugimoto et al. | 364/513 |
| 4,680,519 | 7/1987 | Chand et al. | 364/513 |

OTHER PUBLICATIONS

"Robot Manipulators: Mathematics, Programming and Control," R. P. Paul, MIT Press 1981.

Primary Examiner—Michael R. Fleming
Attorney, Agent, or Firm—Mason, Kolehmainen, Rathburn & Wyss

[57] ABSTRACT

A coordinate conversion system is provided for moving the manipulator arm and hand in repsonse to an input command signal of the $3 \times 4$ matrix type. The manipulator is provided with a fixed offset between two of the secondary wrist axes so that a stronger wrist configuration is provided which can handle heavier payloads.

15 Claims, 3 Drawing Sheets

COORDINATE CONVERSION SYSTEM AND METHOD FOR CONTROLLING AN INDUSTRIAL ROBOT

The present invention relates to coordinate conversion systems and methods for controlling manipulator arms, and, more particularly, to a coordinate conversion system and method for use in controlling an industrial robot of the type which has a six degree of freedom manipulator arm and is equipped with a twist-offset-bend-twist wrist configuration.

In many industrial robots it is desirable to be able to move the tip of the manipulator hand, commonly referred to as the end effector, in a straight line; both during the initial teaching operation when the desired path of the end effector is planned and during repetitive playback cycles when the end affector is repetitively moved over the taught path. Said movement of the end effector in a Cartesian or rectangular coordinate system is usually made in response to stored command signals which represent the desired location of the end affector and orientation of the hand in Cartesian coordinates. However, since the manipulator arm and wrist usually comprise a series of rotary joints it is necessary to convert each of the stored Cartesian coordinate command signals into the corresponding joint angles which will be required to position the end effector at the desired position in a Cartesian or world coordinate system and then move the end effector to this location by rotating each joint to the required joint angle. Furthermore, since it is desirable to store a minimum number of command signals, it is customary to interpolate between two successive stored command signals to provide incremental displacement signals which are also in Cartesian coordinates and must be converted to joint angles before they can be utilized to move the end effector. This means that each conversion from Cartesian coordinates to joint angles (commonly called $\theta$ values) must be accomplished in a minimum of time so that the end effector can be moved along the straight line as fast as possible.

In a six degree of freedom industrial robot the manipulator arm is usually movable in three primary axes and the manipulator hand or end effector is connected to the end of the manipulator arm by a wrist configuration which is movable in three secondary axes. If the three secondary wrist axes intersect at a common point, as is the case with most six axis manipulators, the conversion from Cartesian coordinates to joint angles is relatively simple and can be accomplished in a relatively short amount of time for each interpolation point. However, in some instances it is desirable to introduce a fixed offset between two of the secondary wrist axes to provide a stronger wrist configuration which can handle heavier payloads. Also, the use of a fixed offset can result in a cheaper and simpler wrist arrangement than when all three wrist axes intersect at a common point. However, the use of such a fixed offset in the wrist configuration has heretofore required a much more complicated coordinate conversion process which is so slow that it cannot be used in most industrial applications.

In many instances the stored command signal may be in the form of a 3×4 matrix in which three of the columns, known as column vectors, describe the orientation of the hand or end effector of the manipulator. Each column vector is of unit magnitude and the three terms of each unit vector are functions of the sines and cosines of the individual joints. The three components of the fourth column vector are the Cartesian coordinates of the desired position of the end effector. The use of such matrix type input signals and the modification, rotation and translation of such signals by means of homogeneous transformations is discussed in detail in Robot Manipulators: Mathematics, Programming and Control by Richard P. Paul, MIT Press 1981. Coordinate conversion system which function with such matrix type input signals are presently being used in six axis manipulators in which the three secodary axes intersect at a common point. Also, Hohn U.S. Pat. No. 3,909,600 and Corwin et al U.S. Pat. No. 3,920,972 disclose industrial robot control systems in which Cartesian coordinate input signals, which are not in matrix form, are converted to joint angles and employed to move the manipulator arm to a desired location.

It is, therefore, a primary object of the present invention to provide a new and improved coordinate conversion system and method for controlling an industrial robot of the type having a fixed offset between two of the secondary wrist axes.

It is another object of the present invention to provide a new and improved coordinate conversion system and method for moving the arm of such a robot which is sufficiently fast acting to move the manipulator arm of such a robot at a speed suitable for most induatrial applications.

It is a further object of the present invention to provide a new and improved coordinate conversion system and method for moving the arm of a six axis manipulator wherein a rapidly converging iterative process is employed to convert a Cartesian input command signal into the corresponding joint angles for the three primary axes of said manipulator.

It is a still further object of the present invention to provide a new and improved coordinate conversion system and method for moving the arm of a six axis manipulator which utilizes in a rapidly converging iterative process the final set of joint angles corresponding to a previous Cartesian input command signal as the first approximation set of joint angles in converting the next Cartesian input command signal into the corresponding joint angles.

The invention both as to its organization and method of operation, together with further objects and advantages thereof, will best be understood by reference to the following specification taken in connection with the accompanying drawings, in which.

Figures 1, 2:
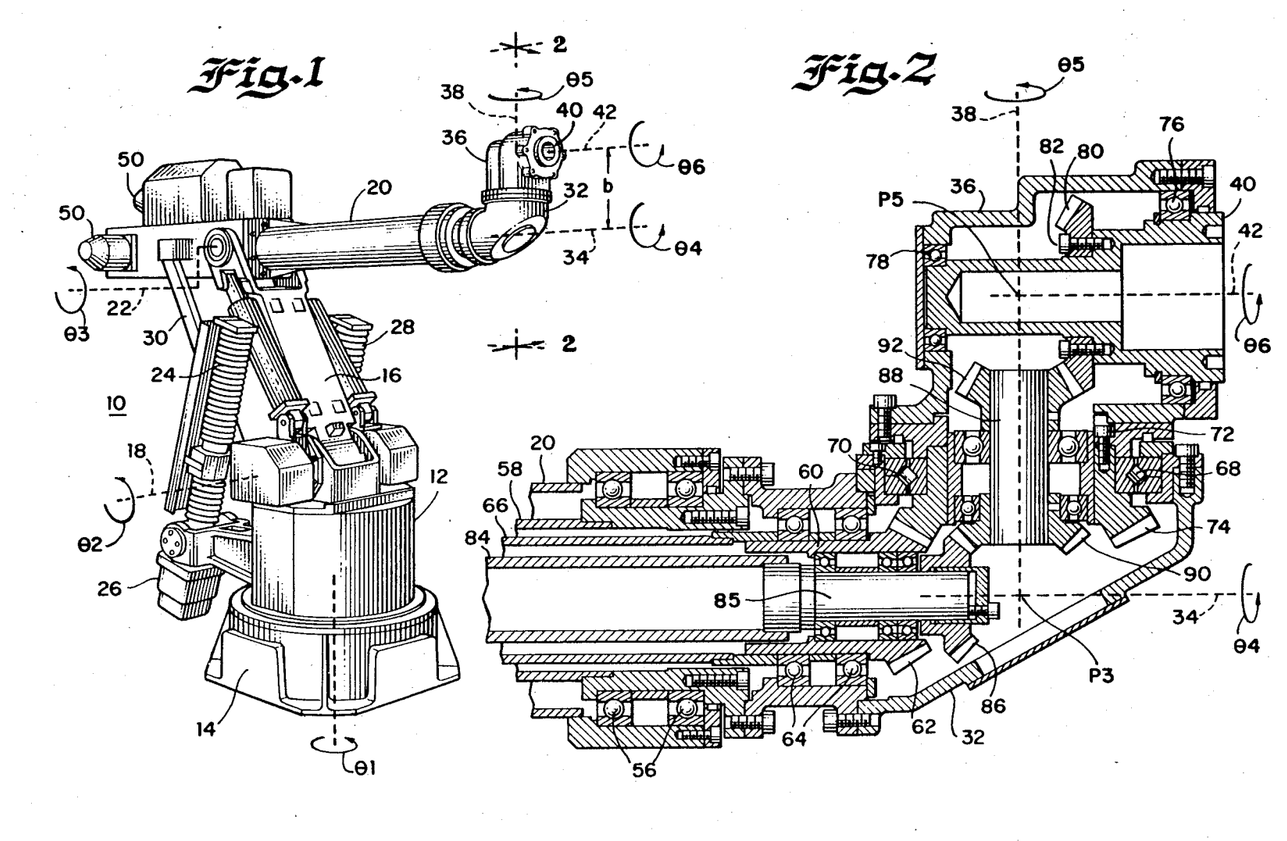
FIG. 1 is a perspective view of a six axis manipulator in which the control system and method of the present inventin may be employed.
FIG. 2 is a sectional, side elevational view of the drive arrangement for the three wrist axes of the manipulator of FIG. 1.

Referring now to the drawings and more particularly to FIGS. 1 and 2 thereof, the coordinate conversion system and method of the present invention is particularly arranged for use with and will be described in connection with a six axis industrial robot 10 of the type shown in FIGS. 1 and 2. More specifically, the industrial robot 10 includes a rotary base member 12 which is rotatably mounted on the base support 14 for rotation about a vertical axis. A lower arm member 16 is pivotally mounted on the upper end of the rotary base member 12 for rotation about the horizontal axis 18. An upper arm member or boom 20 is pivotally mounted on the upper end of the lower arm member 16 for rotation about the horizontal axis 22. A ball screw actuator 24, which is driven by the motor 26, is employed to rotate the lower arm member 16 about the axis 18, i.e. the angle θ2 and the ball screw actuator 28 is employed to rotate the boom 20 about the axis 22, i.e., the angle θ3, through the links 30. Also, an electric motor is provided within the base support 14 which through suitable gearing rotates the base member 12 about a vertical axis i.e. through the angle θ1. The three joint angles θ1, θ2 and θ3 constitute the three primary axes of the industrial robot 10.

In order to provide a strong wrist configuration which is relatively simple to manufacture, an offset right angle housing 32 is rotatably mounted on the outer end of the boom 20 for rotation about the axis 34 i.e., through the angle θ4, the axis 34 intersecting the axis 22 of the pivotally mounted boom 20. Another right angle housing portion 36 is rotatably mounted on the end of the housing 32 for rotation about the axis 38 i.e., through the angle θ5. An annular mounting plate 40, on which a suitable tool such as a gripper, weld gun or sealant dispenser may be mounted, is rotatably mounted in the upper housing 36 for rotation about the axis 42, i.e., through the angle θ6, the axes 38 and 42 intersecting within the upper housing 36 and the axes 38 and 34 intersecting within the lower housing 32.

In order to rotate the tool or end effector mounted on the mounting plate 40 in the three outer wrist axes 34, 38 and 42, the electric motors 50 are mounted on the rear end of the boom 20 behind the rotary axis 22 and are connected to the housing 32, 36 and the face plate 40 through suitable tubular drive members. More particularly, the lower right angle offset housing 32 is rotatably mounted on the outer end of the boom 20 by means of the bearings 56 and is rotated about the axis 34 through the tubular drive member 58 which is connected to one of the motors 50. A sleeve 60 having a bevelled gear 62 on one end thereof, is rotatably mounted in the housing 32 by means of the bearing 64, the sleeves 60 being driven through the tubular drive member 66 which is positioned inside the drive member 58, by another of the drive motors 50. The housing 36 is rotatably mounted in the outer end of the lower housing 32 by means of the bearings 68 and 70 and the sleeve 72 is mounted in the housing 36 and is provided with a bevelled gear 74 on the bottom end thereof which meshes with the bevelled gear 62 so that rotation of the drive member 66 is effective to rotate the upper housing 36 about the axis 38 i.e., through the angle θ5.

The face plate 40 is rotatably mounted in the outer end of the upper housing 36 by means of the bearings 76 and 78 and a bevelled gear 80 is secured to the face plate 40 intermediate the bearings 76, 78 by means of the bolts 82. In order to rotate the face plate 40 about the axis 42, an inner tubular drive member 84, which is positioned inside the tubular member 66 and is driven from one of the motors 50, is connected to a shaft 86 which is rotatably mounted within the sleeve 60 and has the bevelled gear 86 mounted on the outer end thereof. A shaft 88 is rotatably mounted within the sleeve 72 and has the bevelled gear 90 on the bottom end thereof which meshes with the bevel gear 86 and the bevel gear 92 on the other end thereof which meshes with the bevel gear 80.

It will be noted that the two wrist axes 34 and 42 are offset by a distance b which is relatively small as compared to the length of the boom 20 i.e., the distance between the axes 38 and 22. By offsetting the axes 34 and 42 so that these two axes do not intersect at the same point with the axis 38, a relatively strong wrist configuration is provided and a simplified gearing may be employed so as to provide a wrist structure which can be readily manufactured at low cost. In this connection it is noted that the mechanical construction of the industrial robot 10 described thus far is known in the prior art and forms no part of the present invention. However, the coordinate conversion system and method of the present invention is particularly designed for use with an industrial robot having a wrist offset, such as the wrist offset b of the robot 10, and provides a rapidly converging iterative process which is employed to move the manipulator arm of the robot 10 along a predetermined path at industrial speed in response to Cartesian coordinate input command signals. More particularly, the coordinate conversion system of the present invention is arranged to function in a control system of the type shown in FIG. 3 wherein a Cartesian input signal 100 is provided in the form of a so-called T6 transform i.e. a 3×4 matrix in which three of the column vectors describe the orientation of the hand or end effector of the manipulator, these column vectors being of unit magnitude and the three terms of each unit vector being functions of link lengths and the six joint angles of the industrial robot. The three components of the fourth column vector in the T6 transform are the Cartesian coordinates of the desired position of the end effector.

Figure 3:
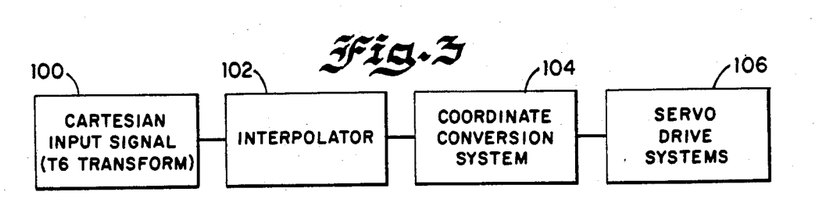
FIG. 3 is a block diagram of the control system for driving the six axes of the manipulator of FIG. 1.
Figure 4:
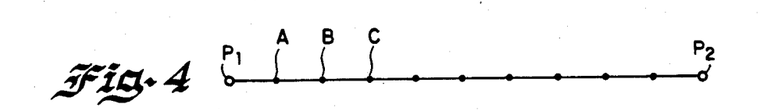
FIG. 4 is a diagram of a typical interpolation system for developing input signals for the control system of FIG. 3.

The use of such matrix type input signals and the modification, rotation and translation of such signals by means of homogeneous transformations is discussed in detail in Robot Manipulators: Mathematics, Programming And Control By Richard P. Paul, MIT Press 1981. The Cartesian input signal 100 is developed during playback cycles by read out from a suitable memory in which the terms of the 3×4 matrix are stored, each input signal representing a desired position and orientation of the robot end effector to which the robot is to be moved during a playback cycle. In the alternative, the input signal 100 may represent a series of positions to which the manipulator arm is to be moved during the teaching mode of operation of the robot, these motions usually being along one of the Cartesian coordinates of a Cartesian frame of reference. Since the stored input signals 100 may represent motion of the end effector over a substantial distance, it is customary to employ an interpolator 102 which stores the desired positions of the arm, such as the end points P$_1$ and P$_2$ of FIG. 4, and develops incremental displacement signals A, B, C, and so forth which are also in Cartesian coordinates and represent displacements along a straight line between the end points P$_1$ and P$_2$. The coordinate conversion system 104 of the present invention is arranged to convert the T6 transform output signals from the interpolator 102 into suitable joint angle signals which are supplied to the servo drive systems 106 which are effective to move each of the servo controlled axes of the six axis manipulator 10. Furthermore, the coordinate conversion system 104 of the present invention is effective to supply the desired joint angle signals for the servo drive systems 106 at a rate which is sufficient to move the end effector of the robot at industrial speeds so that an industrial robot 10, having the mechanical offset b, may be employed for a wide variety of industrail applications.

Figure 5:
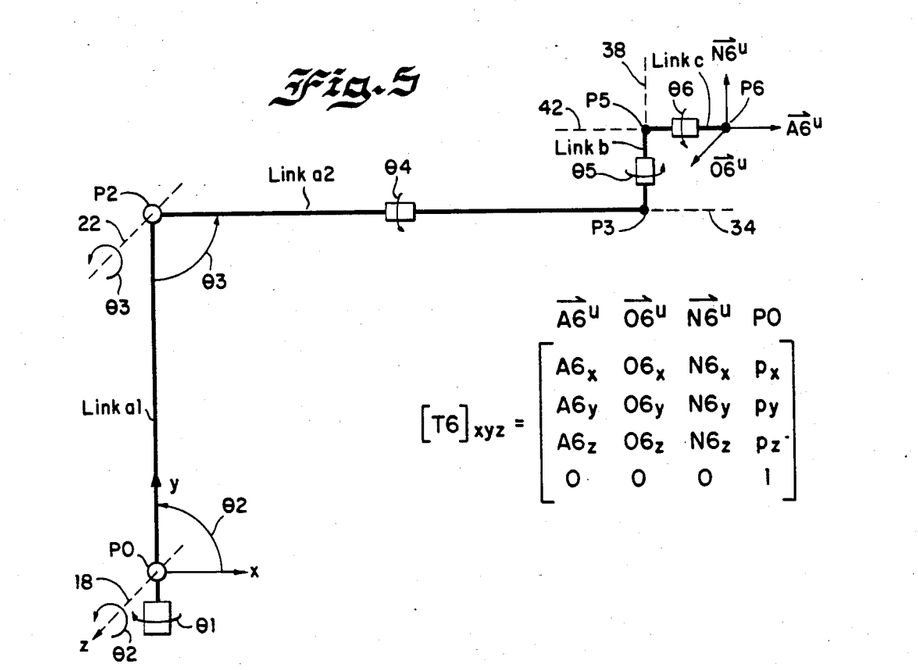
FIG. 5 is a diagram of the linkage arrangement employed in the manipulator of FIG. 1.

In FIG. 5 the industrial robot 10 is shown in schematic form with the origin PO of the base cartesian coordinate system X, y, z positioned at the intersection of link a1 and the rotational axis for joint $\theta$2. The x, y and z axes are orthogonal and fixed in space, and are positioned as shown when joint angle $\theta$1=0 and joint angle $\theta$2=90°. The lower arm member 16 is identified in FIG. 5 as the link a1. The upper arm member or boom 20 is identified in FIG. 5 as the link a2 and the right angle offset members 32, 36 of the robot 10 are identified in FIG. 5 as the link b.

The origin of the case Cartesian coordinate system x, y, z is identified as point PO, and the intersections of the links a1 and a2 is identified as point P2. The end of the manipulator arm, i.e., the intersection of the wrist twist axis $\theta$4 and the bend axis $\theta$5, is identified as point P3, and the intersection of the wrist bend axis $\theta$5 and the offset outermost wrist twist axis $\theta$6 is identified as the point P5. The tip of a tool mounted on the rotary end plate 40 is identified in FIG. 5 as the point P6 and the distance from the intersection of the $\theta$5 and $\theta$6 axes to the tip of the tool is identified as the link c. The orientation of the tool tip at point P6, which is given in the T6 transform, comprises the three unit vectors $\vec{A6^u}$, $\vec{O6^u}$, and $\vec{N6^u}$, which correspond respectively to the approach vector of the hand, the orientation vector which specifies the orientation of the hand (usually from finger tip to finger tip), and a normal vector which is normal to the unit vectors $\vec{A^u}$ and $\vec{O^u}$.

As shown in FIG. 5 the complete T6 transform includes a column vector A6$_x$, A6$_y$ and A6$_z$, corresponding to the $\vec{A6^u}$ approach unit vector; a column vector O6$_x$, O6$_y$ and O6$_z$ corresponding to the orientation unit vector $\vec{O6^u}$; and, a column vector comprising the coordinates N6$_x$, N6$_y$, N6$_z$ corresponding to the normal unit vector $\vec{N6^u}$. The T6 transform also includes a fourth column vector comprising the Cartesian coordinates p$_x$, p$_y$ and p$_z$ of the point P6 at the tip of a tool mounted on the rotary end plate 40.

The industrial robot 10 is shown at FIG. 5 with $\theta$1=0°, $\theta$2=$\theta$3=90°, $\theta$4=0°, $\theta$5=0° and $\theta$6=0°. For these given joint angles, all of the links of the manipulator 10 lie in the xy plane of FIG. 5. Furthermore $\vec{A6^u}$=i(1); $\vec{O6^u}$=k(1) and $\vec{N6^u}$=j(1). It will be understood that link b, i.e., the right angle offset members 32, 36, is always perpendicular to link a2 and link c. In the following analysis, $\vec{a1}$ is the vector from point PO to point P2, $\vec{O\text{-}2}$; $\vec{a2}=\vec{2\text{-}3}$; $\vec{b}=\vec{3\text{-}5}$ and $\vec{c}=\vec{5\text{-}6}$;

In the above description of the industrial robot 10, it has been pointed out how the provision of the right angle offset members 32, 36 provides a mechanical construction which is much stronger than a wrist arrangement in which the three secondary wrist axes intersect at a common point. Also, the industrial robot 10 is less expensive to manufacture due to the inclusion of the right angle offset members 32, 36 which separate the wrist axes and provide a simpler gear train arrangement for driving them. When the three secondary wrist axes intersect at a common location it is a relatively simple matter to provide a direct conversion of the given T6 transform into the joint angles $\theta$1–$\theta$6. Such a conversion is known as a direct inverse solution and is readily attained when the offset link b is set to zero so that point P3 coincides with point P5. This direct inverse solution comprises the steps of:

1. Solving for the coordinates of point P3 which is accomplished by the following:

$$0\text{-}3 = 0\text{-}6 - cA6^u = \begin{bmatrix} x_3 \\ y_3 \\ z_3 \end{bmatrix}_{xyz} = \begin{bmatrix} x_5 \\ y_5 \\ z_5 \end{bmatrix}_{xyz}$$

2. Having the Cartesian coordinates for point P3, the value for $\theta$1 can be obtained from the equation:

$$\theta 1 = \text{Tan}^{-1} (z_3/x_3) \quad (1)$$

3. After the $\theta$1 joint angle has been determined, the $\theta$2 and $\theta$3 joint angles may be determined as follows:

$$\theta 2 = \text{Tan}^{-1}\left(\frac{y_3}{[x_3^2 + z_3^2]^{\frac{1}{2}}}\right) + \quad (2)$$

$$2\text{Tan}^{-1}\left(\left[\frac{(s-a1)(s-d)}{s(s-a2)}\right]^{\frac{1}{2}}\right)$$

$$\theta 3 = 2\text{Tan}^{-1}\left(\left[\frac{(s-a1)(S-a2)}{S(S-d)}\right]^{\frac{1}{2}}\right) \quad (3)$$

where, $$|0\text{-}3| = d = [x_3^2 + y_3^2 + z_3^2]^{\frac{1}{2}}$$

$s$ = semi-perimeter of the traingle $P0$, $P2$, $P3$ $$s = \frac{a1 + a2 + d}{2}$$

After the three primary axis joint angles have been determined in accordance with equations: (1), (2) and (3), above, the joint angles for the three secondary wrist axes $\theta$4, $\theta$5 and $\theta$6 can be determined as described in detail hereinafter:

When the right angle offset members 32, 36, which define offset link b, are employed, it is possible to determine the Cartesian coordinates of point P5 directly by the equation:

$$\overline{0-5} = \overline{0-6} - cA6^u = \begin{bmatrix} x_5 \\ y_5 \\ z_5 \end{bmatrix}_{xyz} \quad (7)$$

However, there is no direct method for determining the Cartesian coordinates of point P3 from equation (7). While it is possible to develop equations defining point P3 in terms of the knowns, i.e., the elements of the given T6 transform, and the unknowns, $\theta 1$, $\theta 2$ and $\theta 3$, said equations are so heavily coupled that it is impossible to extract solutions for $\theta 1$, $\theta 2$ and $\theta 3$.

In accordance with the present invention, an expression for the vector $\vec{b}$, which corresponds to $\overline{3-5}$ of FIG. 5, is developed in terms of the given end effector transform [T6]$_{xyz}$ and the joint angles $\theta 1$, $\theta 2$ and $\theta 3$. Since the link b is always perpendicular to link a2 and link c in the arrangement of the present invention, as shown in FIG. 5, the sense of the cross product of the unit vector $\vec{a2^u}$, corresponding to the link a2, and the unit vector $\vec{A6^u}$, which corresponds to the link c, defines the direction of $\pm \vec{b^u}$ and is given by the equation:

$$a2^u \times A6^u = \begin{bmatrix} \frac{x3-x2}{a2} & x \\ \frac{y3-y2}{a2} & y \\ \frac{z3-z2}{a2} & z \end{bmatrix} \times \begin{bmatrix} A6x & x \\ A6y & y \\ A6z & z \end{bmatrix} = \vec{b_s} \quad (8)$$

The cross product vector result $\vec{b_s}$ has a magnitude and direction. The magnitude $b_s$ is equal to sine $\theta 5$, and the unit sense direction vector $[\vec{b_s^u} \approx \vec{b_s}/|\vec{b_s}|]$ is equal to $\pm \vec{b^u}$.

The Cartesian coordinates for point P2 in terms of link dimensions $\theta 1$ and $\theta 2$ are given by the following equations:

$$x2 = a1 \cos \theta 2 \cos \theta 1 \quad (9)$$

$$y2 = a1 \sin \theta 2 \quad (10)$$

$$z2 = a1 \cos \theta 2 \sin \theta 1 \quad (11)$$

The coordinate values for point P3 in terms of the link dimensions and $\theta 1$, $\theta 2$ and $\theta 3$ are given by the following equations:

$$x3 = x2 + a2 \cos \theta 3^* \cos \theta 1 \quad (12)$$

$$y3 = y2 - a2 \sin \theta 3^* \quad (13)$$

$$z3 = z2 + a2 \cos \theta 3^* \sin \theta 1 \quad (14)$$

where, $\theta 3^* \approx 180 - \theta 2 - \theta 3$.

From equations (9)–(14) the equation (8) may be expanded to provide the following cross product result:

$$a2^u \times A6^u = i[X_C] + j[Y_C] + k[Z_C] \quad (15)$$

where:

$$X = [-A6y \cos \theta 3^* \sin \theta 1 - A6z \sin \theta 3^*]$$

-continued
$$Y = [A6x \cos \theta 3^* \sin \theta 1 - A6z \cos \theta 1]$$

$$Z = [A6x \sin \theta 3^* + A6y \cos \theta 3^* \cos \theta 1]$$

and, $$|\theta 5| = \sin^{-1} [X_C^2 + Y_C^2 + Z_C^2]^{\frac{1}{2}}$$

and, $$\frac{a2^u \times A6^u}{|b_s|} = \pm \vec{b^u} = \frac{iX_C + jY_C + kZ_C}{[X_C^2 + Y_C^2 + Z_C^2]^{\frac{1}{2}}} \quad (16)$$

From equation (16) the Cartesian coordinates of point P3 can be determined as follows:

$$x3_C = \left[ x5 - \frac{\pm bX_C}{(X_C^2 + Y_C^2 + Z_C^2)^{\frac{1}{2}}} \right] \quad (17)$$

$$y3_C = \left[ y5 - \frac{\pm bY_C}{(X_C^2 + Y_C^2 + Z_C^2)^{\frac{1}{2}}} \right] \quad (18)$$

$$z3_C = \left[ z5 - \frac{\pm bZ_C}{(X_C^2 + Y_C^2 + Z_C^2)^{\frac{1}{2}}} \right] \quad (19)$$

The present invention provide a rapidly converging iterative process which employs equations (17)–(19) to determine the desired joint angle values for $\theta 1$, $\theta 2$, and $\theta 3$ from the given end effector transform T6 in Cartesian coordinates. Equations (17)–(19) define the coordinates of point P3 as a function of the elements of the given end effector transform [T6]$_{xyz}$. The iterative process of the present invention takes advantage of the fact that the manipulator arm will not move very far during one computation interval. Typically, a computer cycle time during which an interpolation point is computed in Cartesian coordinates, i.e., the given T6 transform, is in the order of twenty-five milliseconds. During this interval, the joints of the manipulator arm will typically move equal to or less than one or two degrees. Accordingly, the assumption can be made that the direction of the vector $a2^u$ will not change appreciably between the sequential input Cartesian T6 commands. The vector a2 is a function of $\theta 1$, $\theta 2$ and $\theta 3$ and in accordance with the present invention the final set of joint angles $\theta 1$, $\theta 2$ and $\theta 3$, which are developed in response to the previous T6 command signal, are employed as the first estimated values for $\theta 1$, $\theta 2$ and $\theta 3$ for the next command signal.

Using these previously determined $\theta 1$, $\theta 2$ and $\theta 3$ values, equations (9)–(14) are employed to determine the Cartesian coordinates of point P2, i.e., x2, y2, and z2 and the Cartesian coordinates of point P3, i.e., x3, y3 and z3. The vector $a2^u$ is then determined from the relationship:

$$a2^u = \frac{i(x3 + x2)}{a2} + \frac{j(y3 + y2)}{a2} + \frac{k(z3 + z2)}{a2} \quad (20)$$

After the $\vec{a2^u}$ vector is obtained, the vector $\pm \vec{b^u}$ can be obtained from equation (16) and substituted in equations (17)–(19) to obtain a first estimated set of Cartesian coordinate values for x3, y3, and z3, which may be identified by appending the subscript "1" to each, i.e., $x3_1$, $y3_1$, and $z3_1$.

Once this first estimated set of coordinates is obtained for point P3, referred to hereinafter as P3$_1$, equations (1), (2) and (3) can be employed to determine a first iteration set of tentative joint angles $\theta 1_1$, $\theta 2_1$ and $\theta 3_1$ which will be closer to the joint angles which correspond to the new T6 command signal than the previously determined $\theta 1$, $\theta 2$ and $\theta 3$ values.

The second iteration of the converging process is then executed using the tentative set of joint angles $\theta 1_1$, $\theta 2_1$ and $\theta 3_1$ from the first iteration step. More particularly, a new set of Cartesian coordinates for points P2 and P3 are determined from equations (9)-(14), i.e. $x2_2$, $y2_2$, $z2_2$ and $x3_2$, $y3_2$, $z3_2$, and a new $\vec{a2}$ vector is determined from equation (20). The new $\vec{a2}$ vector is then employed to determine a more accurate $\pm \vec{b}^u$ vector from equation (16) which is then substituted in equations (17)-(19). In this connection it will be understood that the corrdinates of point P5, i.e., x5, y5 and z5 do not change from iteration to iteration, since they are determined directly from the given T6 transform from equation (7).

The new set of coordinates for point P3, i.e., $x3_2$, $y3_2$, and $z3_2$ obtained from equations (17)-(19) provide a new target value for point P3, i.e. $P3_2$, which will be closer to the correct final value than $P3_1$. Equations (1) (2) and (3) are then employed to determine a new set of tentative joint angles from the coordinates of $P3_2$ which then provide a tentative set of joint angles $\theta 1_2$, $\theta 2_2$ and $\theta 2_3$ which are closer to the correct values for $\theta 1$, $\theta 2$ and $\theta 3$ corresponding to the input command signal T6.

After the second iteration step has been completed, the second set of tentative joint angles $\theta 1_2$, $\theta 2_2$ and $\theta 3_2$ may then be employed as the input signals for the third iteration step. Using this second set of tentative joint angles, equations (9)-(14) and (20) are employed to determine a new $\vec{a2}$ vector and equation (16) is then employed to provide a new $\pm \vec{b}^u$ vector and equations (17)-(19) are then employed to provide a new set of coordinate values x3, y3 and z3 corresponding to the new target value for point P3, i.e. $P3_3$. Equations (1), (2) and (3) are then employed to obtain the third set of tentative joint angles $\theta 1_3$, $\theta 2_3$ and $\theta 3_3$.

The iterative process may then be repeated for as many iterations as is necessary until the change in joint angles between successive iterations decreases to a predetermined value. For example, the iterations may be repeated until the differences between the last two sets of tentative joint angles, respectively, are less than 1 encoder bit of the encoder used to measure that particular axis. When this occurs at some iteration N, then the last iteration value set for $\theta 1_N$, $\theta 2_N$ and $\theta 3_N$ is accepted as the correct joint angles for $\theta 1$, $\theta 2$ and $\theta 3$ which correspond to the input command signal T6. For typical Cartesian real time moves, the iterative process of the present invention converges in less than 3 to 4 iterations. Typically, these iterations are completed in less than 10 milliseconds so that the iterative process of the present invention may be employed to move the end effector of the industrial robot 10 with position and orientation controlled motion at acceptable speeds for industrial processes such as arc welding, spot welding and sealant deposition.

It will be noted that in equation (16) the $\vec{b}^u$ vector has both plus and minus values. This is due to the fact that, generally speaking, there are two distinct arm positions which can produce the same cross-product result, which is used to define $\vec{b}^u$; i.e., $$b^u = \frac{a_2{}^u \times A_6{}^u}{|a_2{}^u \times A_6{}^u|}$$

For the example of FIG. 5, points P5 and P6 could be located below point P3, in lieu of above as shown, and still define the same $\vec{A_6}^u$ vector, yielding the identical soultion for $\vec{b}^u$. To accomplish this would call for a 180° rotation of $\theta 4$, leaving $\theta 5$ fixed and equal to zero for the example of FIg. 5. Accordingly, there are two sets of joint angles corresponding to the two values of the $\pm \vec{b}^u$ vector. These two sets of joint angles may be identified as either the "no flip" set of joint angles which has a positive (+) $\theta 5$ joint angle or the "flip" set of joint angles which has a negative (−) $\theta 5$ joint angle.

Since (17)-(19) give two different sets of values for the coordinates x3, y3, z3 corresponding to the two values of $\pm \vec{b}^u$ vector, it is necessary to determine the proper sign which should be used in these equations to give the correct x3, y3 and z3 coordinates during each iteration of the converging process of the present invention. In accordance with an important aspect of the present invention the correct sign is determined by using the coordinate values of the point P3 which had been determined in the final iteration of the previous command signal, which coordinate values can be identified as $x3_{old}$, $y3_{old}$ and $z3_{old}$, and selecting that one of the two solutions to equations (17)-(19) which is closest to the old P3 coordinates. More particularly, the distance $\Delta S$ between the old coordinates point P3 and the new coordinates of point P3 as determined from equations (17)-(19) is computed for both the plus and minus solutions of these equations and the sign corresponding to the smallest distance $\Delta S$ is selected as the correct sign to be used in determining the new coordinates for point P3. Thus, the distance $\Delta S$ is computed using the equation:

$$S = [(x3_{new} - x3_{old})^2 + (y3_{new} - y3_{old})^2 + (z3_{new} - Z3_{old})^2]^{\frac{1}{2}} \quad (21)$$

where $x3_{new}$, $y3_{new}$ and $z3_{new}$ will each have two sets of values corresponding to the plus and minus values used in equations (17)-(19).

The selection of the shortest distance $\Delta S$ and the use of the corresponding values for $x3_{new}$, $y3_{new}$ and $z3_{new}$ from equations (17)-(19) may either be performed during each iteration step of the converging process or, in the alternative, once the proper sign has been determined this sign can be used during the remaining iterative steps of the process to determine the desired final value of $\theta 1$, $\theta 2$ and $\theta 3$ for a given T6 input signal.

It should be noted while the iterative inverse conversion process of the present invention works efficiently and provides a rapid solution for the joint angles which place the end effector in the position and orientation specified by the T6 transform input command signal, the iterative conversion process does not function properly for those positions where $\theta 5$ is close to zero. For example, given the arm position shown in FIG. 5, one cannot move the end effector point P6 in pure translation for a +X displacement. While one can move point P6 along the +X axis, it is impossible to hold point P5 on its required path because of the fixed right angle connections between the links a2, b and c. Consequently, the command orientation for the $A_6{}^u$ vector cannot be maintained. This physical limitation holds true for any joint angle set for $\theta 1$, $\theta 2$, $\theta 3$ and $\theta 4$, where a pure translation is called for in the $+A6^u$ direction with $\theta5$ equal to zero. It should also be pointed out that at angles around $\theta5=0$ the iterative converging process of the present invention fails because the cross product of $(a2^u \times A6^u)$ approaches zero at $\theta5=0$ and it becomes impossible to extract the correct sense vector result which defines the $b^u$ vector.

These problems are avoided in accordance with the present invention by preventing the teaching of new Cartesian defined points during the teaching operation if the absolute value of $\theta5$ is equal to or less than 5°. The absolute value of $\theta5$ can be readily determined from the encoder which measures the $\theta5$ joint angle movement. If the absolute value of $\theta5$ is equal to or less than 5° an appropriate signal is given to the teaching operator informing him that the contemplated move to the new point cannot be made in straight line motion and hence the new point should be defined in joint angles rather than in Cartesian coordinates. The constraint that straight line motions should not include movements in which $\theta5$ is close to zero does not render the iterative conversion process of the present invention unsuitable for industrial applications since one can still execute most tasks by means of proper tooling and planning without moving the end effector along the $A6^u$ direction while $\theta5$ is close to zero. If it is necessary to traverse through $\theta5=0$, then such motion can be effected in a coordinated joint move mode where one accepts the resultant non linear intermediate trajectory which is produced during such a move.

After the correct $\theta1$, $\theta2$, and $\theta3$ values have been determined, the correct joint angles for the secondary wrist axes $\theta4$, $\theta5$ and $\theta6$ may then be determined to provide the total set of 6 joint angles for the 6 axis robot 10 from the input signal T6.

Figure 6:
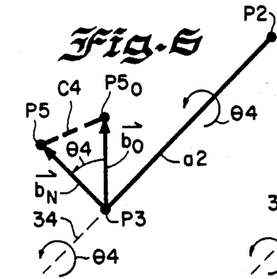
FIG. 6 is a diagram which is useful in developing the value of the $\theta 4$ joint angle in FIG. 5.

In order to solve for $\theta4$, reference may be had to FIG. 6 wherein a point $P5_0$ is defined as the position of point P5 with the current values as calculated for $\theta1$, $\theta2$ and $\theta3$, and $\theta4$ equal to zero. This defines a reference start vector $\vec{3\text{-}5_0}$.

The equations defining the coordinates of point $P5_0$ in terms of $\theta1$, $\theta3^*$, and $\theta4$, are as follows:

$$x5 = x3 + b\cos\theta4 \sin\theta3^* \cos\theta1 - b\sin\theta4 \sin\theta1 \tag{g}$$

$$y5 = y3 + b\cos\theta4 \cos\theta3^* \tag{h}$$

$$z5 = z3 + b\cos\theta4 \sin\theta3^* \sin\theta1 + b\sin\theta4 \cos\theta1 \tag{i}$$

From equations (g), (h) and (i) the coordinates of point $P5_0$ can be obtained by setting $\theta4$ to zero, which gives:

$$x_{5_0} = x3 + b\sin\theta3^* \cos\theta1 \tag{g*}$$

$$y_{5_0} = y3 + b\cos\theta3^* \tag{h*}$$

$$z_{5_0} = z3 + b\sin\theta3^* \sin\theta1 \tag{i*}$$

Since the coordinates of point P3 and point P5 have been determined (P5 from equation (7) and P3 from equations (17)–(19), once the proper sign has been determined for $\pm b$), it is now possible to use the triangle formed by the points P5, P3, and $P5_0$, to determine the angle between $\vec{3\text{-}5_0}$ and $\vec{3\text{-}5}$, which is the angle $\theta4$. In this connection, will be noted that the absolute value of the vectors $\vec{3\text{-}5_0}$ and $\vec{3\text{-}5}$ is equal to the length of link b. This link revolves about the $\vec{a2}$ axis. The sides of this triangle can be defined as shown in FIG. 6 and the length of the side $C_4$ can be determined from the equation:

$$C_4 = [(x5-x5_0)^2 + (y5-y5_0)^2 + (z5-z5_0)^2]^{\frac{1}{2}}$$

The other two sides of the reference triangle are both equal to the length of link b.

If the semiperimeter of this reference triangle is defined as $S_4$ then:

$$S_4 = \left[\frac{b_o + b_N + C_4}{2}\right]$$

$$\theta4 = 2\tan^{-1}\left\{\left[\frac{(S_4-b_o)(S_4-b_N)}{S_4(S_4-C_4)}\right]^{\frac{1}{2}}\right\}$$

Having a solution for the magnitude of $\theta4$ it is necessary to determine its signal. To do this, the cross product of $b_o{}^u$ and $b_N{}^u$ is taken as follows:

$$b_o{}^u \times b_N{}^u = R4 = iR4_x + jR4_y + kR4_z$$

The unit sense of the cross product result is:

$$R4^u = \frac{iR4_x + jR4_y + kR4_z}{[R4_x{}^2 + R4_y{}^2 + R4_z{}^2]^{\frac{1}{2}}}$$

If $\vec{R4^u}$ equals $\vec{a2^u}$ then $\theta4$ is positive. If $\vec{R4^u} = -\vec{a2^u}$, then $\theta4$ is negative.

Figure 7:
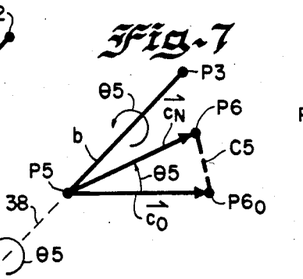
FIG. 7 is a diagram which is useful in developing the value of the $\theta 5$ joint angle in FIG. 5.

Having now the correct solution for the magnitude and sign of $\theta4$, it is then necessary to extract a solution for $\theta5$ using esentially the same solution method. Thus, referring to FIG. 7, one can solve for $\theta5$ through the triangle formed by points P6, P5 and $P6_0$ with $\theta5$ as the angle between $\vec{C_0}$ and $\vec{C_n}$, $\vec{C_0}$ being the direction of the C vector with $\theta5$ set to zero degrees. We can derive the coordinates for point $P6_0$ from the following equations:

$$x6 = x5 + C\cos\theta5\cos\theta3^*\cos\theta1 + C\sin\theta5\sin\theta4\sin\theta3^*\cos\theta1 + C\sin\theta5\cos\theta4\sin\theta1 \tag{j}$$

$$y6 = y5 = C\cos\theta5\sin\theta3^* + C\sin\theta5\sin\theta4\cos\theta3^* \tag{k}$$

$$z6 = z5 + C\cos\theta5\cos\theta3^*\sin\theta1 + C\sin\theta5\sin\theta4\sin\theta3^*\sin\theta1 - C\sin\theta5\cos\theta4\cos\theta1 \tag{l}$$

By inserting current solution for $\theta1$, $\theta2$, $\theta3$ and $\theta4$ and setting $\theta5$ equal to zero, equations (j), (k) and (l) reduce the following:

$$x6_0 = x5 + C\cos\theta3^*0\cos\theta1 \tag{j*}$$

$$y6_0 = y5 - C\sin\theta3^* \tag{k*}$$

$$z6_0 = z5 + C\cos\theta3^*\sin\theta1 \tag{l*}$$

We can now solve for the length of $P6_0\text{-}P_6 \approx C5$ from the following:

$$C5 = [(x6-x6_0)^2 + (y6-y6_0)^2 + (z6-z6_0)^2]^{\frac{1}{2}}$$

The other two sides of the triangle formed by points P6, P5 and $P6_0$ are $|\vec{C_0}|$ and $|\vec{C_n}|$ which are both equal to the length of link c.

Proceeding as before one can solve for the semiperimeter S5 of this reference triangle as follows:

$$S5 = \left[ \frac{C_0 + C_N + C5}{2} \right]$$

and, $$|\theta 5| = 2 \operatorname{Tan}^{-1} \left\{ \left[ \frac{(S5 - C_0)(S5 - C_N)}{S5(S5 - C5)} \right]^{\frac{1}{2}} \right\}$$

It is then necessary to determine the sign of $\theta 5$ which is obtained by taking the cross product as before:

$$\vec{C_0^u} \times \vec{C_N^u} = \vec{R5} = iR5_x + jR5_y + kR5_z$$

The unit sense of such result is $\vec{R5^u}$, where $$R5^u = \frac{iR5_x + jR5_y + kR5_z}{[R5_x^2 + R5_y^2 + R5_z^2]^{\frac{1}{2}}}$$

If $\vec{R5^u} = (\vec{3\text{-}5^u}) = \vec{b^u}$ then $\theta 5$ is positive. Similarly, if $\vec{R5^u} = -(\vec{3\text{-}5}) = -\vec{b^u}$ then $\theta 5$ is negative.

Figure 8:
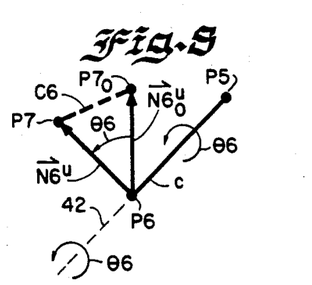
FIG. 8 is a diagram which is useful in developing the value of the θ6 joint angle in FIG. 5.

Having now a complete solution for $\theta 5$ the solution for $\theta 6$ can be determined with reference to FIG. 8. In this figure, the three sides of the triangle formed by points P7, P6, and P7$_0$ are as follows:

1. The vector $\vec{6\text{-}7_0^u}$ is equal to the handset vector $N6^u$ with $\theta 6$ equal to zero which is equal to $\vec{N6_0^u}$. This vector has a length of 1 unit.

2. The vector $\vec{6\text{-}7^u}$ is equal to the handset vector $N6^u$, which is given by the T6 input transform along with the coordinates of P6. $\vec{N6^u}$ is a unit length vector.

3. The magnitude $|\vec{7_0 7}|$ is defined as side C6 and is the third side of the defining triangle.

From this triangle we solve for the angle $\theta 6$ between the vectors $\vec{N6_0^u}$ and $\vec{N6^u}$. The FIG. 8 points P7$_0$ and P7 have been arbitrarily assigned so that a triangle solution can be obtained as before. Point P7$_0$ is the tip of the unit length handset vector $N6_0^u$ and point P7 is the tip of the unit length handset vector $N6^u$, respectively.

The expressions for $N6_{xo}$, $N6_{yo}$ and $N6_{zo}$ are given by the following equations:

$$N6_{xo} = \cos\theta 4 \sin\theta 3^* \cos\theta 1 - \sin\theta 4 \sin\theta 1 \quad (m)$$

$$N6_{yo} = \cos\theta 4 \cos\theta 3^* \quad (n)$$

$$N6_{zo} = \cos\theta 4 \sin\theta 3^* \sin\theta 1 + \sin\theta 4 \cos\theta 1 \quad (o)$$

Using these equations, the value of C6 can be determined from the following:

$$C6 = [(N6_x - N6_{xo})^2 + (N6_y - N6_{yo})^2 + (N6_z - N6_{zo})^2]^{\frac{1}{2}}$$

The semiperimeter S6 of the reference equation is given by the following $$S6 = \left[ \frac{C_6 + 1 + 1}{2} \right]$$

where the two 1's correspond to unit length sides $N6_0^u$ and $N6^u$ and, $$|\theta 6| = 2 \operatorname{Tan}^{-1} \left\{ \left[ \frac{(S6 - 1)(S6 - 1)}{S6(S6 - C6)} \right]^{\frac{1}{2}} \right\}$$

Finally, solving for the sign of $\theta 6$, the cross product of $\vec{N6_0^u}$ and $\vec{N6^u}$ is taken, as follows:

$$N6_o^u \times N6^u = R6 = iR6_x + jR6_y + kR6_z$$

and $$R6^u = \left[ \frac{iR6_x + jR6_y + kR6_z}{(R6_x^2 + R6_y^2 + R6_z^2)^{\frac{1}{2}}} \right]$$

If $R6^u = 5 - 6^u = C^u$, then $\theta 6$ is positive.

If $R6^u = -(5 - 6^u) = -C^u$, then $\theta 6$ is negative.

This completes the inverse solutions for $\theta 4$, $\theta 5$ and $\theta 6$, respectively.

When the iterative inverse conversion process of the present invention is used for real time processing i.e., during playback cycles as distinguished from the teach cycle when more time is permitted for the conversion process, the final values of the joint angles must be developed from the Cartesian T6 transform input signal within a fixed compute time such as 10 milliseconds. There are some cases where the rate of convergence is less rapid and 5, 6, 7 or even more iterations are required before the difference between two successive sets of joint angles ($\Delta\theta 1$, $\Delta\theta 2$ and $\Delta\theta 3$) all become less than the least significant encoder bit of their respective axes, which may be considered as the exact joint angle for that axis, as described heretofore. In accordance with an important aspect of the present invention a method is provided for truncating the iteration process at N iterations, and then executing an intelligent interpolation process based on the data accumulated from these N iterations and data from a partial solution for the $(N+1)^{th}$ iteration. This truncation process permits the rapid conversion of the input T6 transform into the exact corresponding joint angles for all positions to which the end effector of the industrial robot 10 can be moved, other than those moves along the $A6^u$ vector while $\theta 5$ is close to zero as discussed previously, so that straight line moves can be made by the robot 10 at maximum speed.

Figure 9:
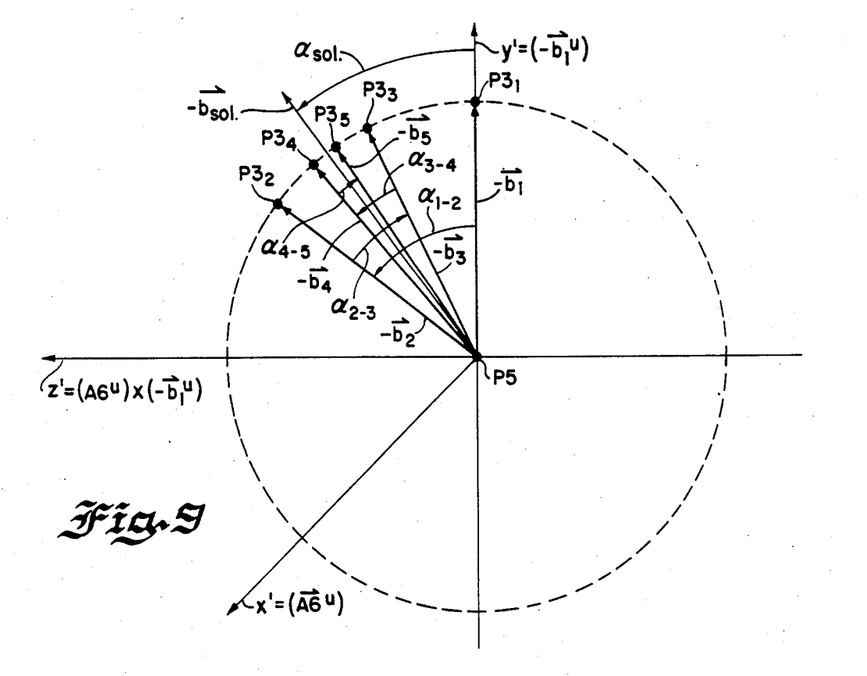
FIG. 9 is a diagram of the variations in orientation of the link b vector relative to the link c rotation axis with successive iterations of the coordinate conversion system of the present invention.

In order to provide a better understanding of the truncation process of the present invention it will be helpful first to refer to FIG. 9 which shows the successive positions of the $-\vec{b}$ vector during successive iterations of the converging process. We know that the solution for point P3 lies on a circle defined by the $-\vec{b}$ vector which rotates about the $\vec{A6^u}$ axis (with point P5 remaining fixed and defined from input T6 transform via equation (7)). It is then necessary to find the correct coordinates of point P3. As is evident from FIG. 9, the $-\vec{b}$ vectors for successive iterations flip back and forth across the desired final solution value, identified as $-\vec{b}_{sol}$, with decreasing error for each iteration. The diagram in FIG. 9 is identified as the $\vec{A6}$ vector locus circle, this circle being defined as a circle of radius b which is centered at point P5 and rotates about the vector $\vec{V6^u}$. Since link b is always perpendicular to link c (and the $\vec{A6}$ vector of the given T6 transform), the final correct solution for point P3 must lie on this $\vec{A6}$ vector locus circle and the iteration process of the present invention should converge rapidly to the final solution point $-\vec{b}_{sol}$. In FIG. 9, the $\vec{A6}^u$ vector locus circle is provided with a set of orthogonal axes X', Y' and Z' with the origin thereof located at point P5. The X' axis corresponds to the $\vec{A6}^u$ vector of the input T6 transform, the Y' axis is defined by $(-\vec{b}_1^u)$ which is the value of the $-\vec{b}^u$ vector produced during the first iteration and employed to define point P3$_1$ which is the entry reference point to the $\vec{A6}$ vector locus circle. The Z' axis is defined by $(\vec{X'}^u \times \vec{Y'}^u) = \vec{A6}^u \times (-\vec{b}_1^u)$.

To illustrate the truncation process, a value of N=4 iterations will be described. FIG. 9 shows the physical location of the $-\vec{b}_i$ vectors on the A6 locus circle. The $-\vec{b}_i$ intermediate solutions for iterations one through four $(-\vec{b}_1, -\vec{b}_2, -\vec{b}_3$ and $-\vec{b}_4)$ are shown in this figure as well as the $-\vec{b}_5$ vector of the (N+1)$^{th}$ iteration. The angle between $-\vec{b}_1$ and $-\vec{b}_2$ is defined as $\alpha_{1-2}$; the angle between $-\vec{b}_2$ and $-\vec{b}_3$ is defined as $\alpha_{2-3}$, and so forth. The $-\vec{b}_1$ vector is our reference axis Y' and therefor alpha$_1$=0°.

Figure 10:
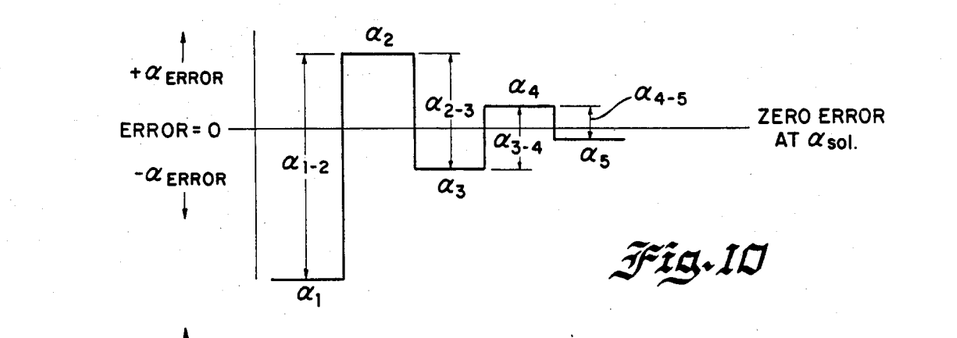
FIG. 10 is a diagram of the variations in the alpha($\alpha$) error function for the oscillating mode with damping factor X in the coordinate conversion system of the present invention.
Figure 11:
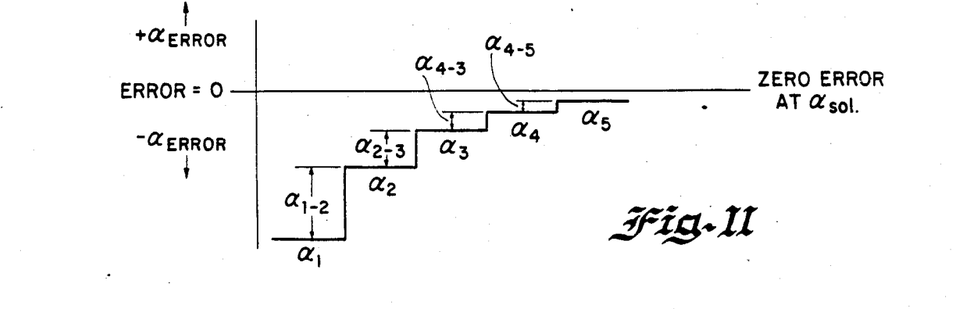
FIG. 11 is a diagram of the variations in the alpha($\alpha$) error function for the non-oscillating mode.

In FIG. 9 it is clear that the $-\vec{b}$ vector is oscillating about and converging on the correct $-\vec{b}_{sol}$ vector ($-b_{sol.} \approx$ the correct solution for $-\vec{b}$). In the truncation process of the present invention a damping factor X is assigned to this process which relates the size of successive errors in the rotation angle "alpha" relative to the correct solution angle for alpha ($\approx$alpha$_{sol}$). The damping factor X is a positive or negative number with absolute values less than 1, generally in the zero to 0.3 range. FIG. 10 demonostrates the negative X, or oscillatory case, where successive $-\vec{b}$ vectors overshoot the correct solution angle, reversing the getting closer with each iteration. FIG. 11 is a plot of the variations in alpha error for the non-oscillatory case where X is positive.

In the truncation process of the present invention the following linear approximation is made as the iterative process converges on the correct alpha$_{sol}$ value:

$\alpha$1error=E$_1$
$\alpha$2error=E$_2$=X $\alpha$1error=X E$_1$
$\alpha$3error=E$_3$=X E$_2$
$\alpha$4error=E$_4$=X E$_3$
$\alpha$5error=E$_5$=X E$_4$
$\alpha$Nerror=E$_N$=X E$_{N-1}$ The closer the iterative process is to the correct solution, the more accurate is the linearization process. For this reason X is determined in the region between alpha3 to alpha5 as follows:

$$\alpha_{3-4} = E_4 - E_3 = XE_3 - E_3 = -E_3(1-X) \quad (22)$$

$$\alpha_{4-5} = E_5 - E_4 = X^2E_3 - XE_3 = -XE_3(1-X)$$

$$\text{Therefore, } \frac{\alpha_{4-5}}{\alpha_{3-4}} = \frac{-XE_3(1-X)}{-E_3(1-X)} = X$$

Equation (22) therefore yields an accurate value for X in the vicinity of the correct solution.

Equation (22) holds for both the oscillatory case depicted in FIG. 10 where X is negative, and also the non-oscillatory case shown in FIG. 11 wherein X is positive. The non-oscillatory case of FIG. 11 is characterized by the iterative process progressively approaching alpha$_{sol}$ from one side of the axis of the other without crossing over the axis.

The assumption that:

$$X = \frac{\alpha_{2-3}}{\alpha_{1-2}} = \frac{\alpha_{3-4}}{\alpha_{2-3}} = \frac{\alpha_{4-5}}{\alpha_{3-4}}, \text{ etc.}$$

is very accurate after three or four iterations and hence the execution of N=4 iterations gives a value close to the correct solution vaue for alpha.

In order to determine the damping factor X it is necessary to compute the values for $\alpha_{4-5}$ and $\alpha_{3-4}$. Considering first the $\alpha_{3-4}$ value, which is the angle between $-\vec{b}_3$ and $-\vec{b}_4$ vectors, the cross product of $(-\vec{b}_3^u \times -\vec{b}_4^u)$ provides a resultant absolute value which is equal to the absolute value of the sine of $\alpha_{3-4}$. The sense of this cross product result is then compared to the sense of $\vec{A6}^u$ (axis of rotation). If these senses are the same, then $\alpha_{3-4}$ is positive and, conversely, if the sense of the cross product is opposite to $\vec{A6}^u$, then the direction of rotation for $\alpha_{3-4}$ is negative.

In order to compute the value $\alpha_{4-5}$, a fifth iteration is partially completed. More particularly, using $\theta_{14}$, $\theta_{24}$ and $\theta_{34}$ as the joint angle inputs, the coordinates of point P3$_5$ are computed from equations (9)–(14) and a new $\vec{a2}$ vector is computed from equation (20). The cross product of this new $\vec{a2}_5^u$ and the $\vec{A6}^u$ vector then provides then $-\vec{b}_5$ value. The cross product of $(-\vec{b}_4^u \times -\vec{b}_5^u)$ provides a result the asolute value of which is equal to the sine of $\alpha_{4-5}$ and a unit sense vector which is then compared with the $\vec{A6}^u$ axis of rotation to determine the proper sign. The arc sine may then be taken of the values sine $\alpha_{3-4}$ and sine $\alpha_{4-5}$ to extract the desired values $\alpha_{3-4}$ and $\alpha_{4-5}$ to determine the damping factor X from equation (22). In the alternative the damping factor X may be calculated by the approximation expression:

$$X = \frac{\alpha_{4-5}}{\alpha_{3-4}} \approx \frac{\sin \alpha_{4-5}}{\sin \alpha_{3-4}}$$

This approximation is very accurate over the small $\alpha_{3-4}$ angle range which results at N=4 ($\alpha_{3-4}$ is generally equal to or less than 2°).

A factor K may now be derived. From FIGS. 9, 10 and 11, it can be seen that $\alpha_5 + \alpha_{5error} = \alpha_{sol}$ and $\alpha_4 + \alpha_{4error} = \alpha_{sol}$. From these relationships it follows that:

$$\alpha_{4-5} = \alpha_5 - \alpha_4 = (\alpha_{sol.} - \alpha_{5error}) - (\alpha_{sol.} - \alpha_{4error})$$

Therefore, $$\alpha_{4-5} = -\alpha_{5error} + \alpha_{4error} \quad (23)$$

However, from equation (22) it can be seen that:

$$\alpha_{4error} = \alpha_{5error}/X$$

substituting ($\alpha_{5error}$/X) for $\alpha_{4error}$ in equation (23) gives:

$$\alpha_{4-5} = \alpha_{5error} + \alpha_{5error}/X$$

Solving for $\alpha_{5error}$ gives:

$$\alpha_{5error} = \frac{X}{(1-X)} \alpha_{4-5} = K \alpha_{4-5} \quad (24)$$

From equation (24) it is now possible to project the correct location for $-b_{sol}$, which defines the position for the exact Cartesian coordinates for point P3 corresponding to the input T6 transform signal, which coordinates can then be used to derive the exact joint angles $\theta_1$, $\theta_2$, and $\theta_3$ by means of equations (1), (2) and (3). More particularly, the correct location for $-b_{sol}$ can be obtained by the following steps:

(a) the damping factor X is derived from the equation $X = \sin \alpha_{4\text{-}5}/\sin \alpha_{3\text{-}4}$. After X has been derived, the K factor of equation (24) may be obtained from the relation $K = X/(1-X)$.

(b) Once the K factor has been computed, equation (24) may be used to provide the magnitude and since of $\alpha_{5error}$, i.e. $\alpha_{5error} = K\alpha_{4\text{-}5} \approx K \sin(\alpha_{4\text{-}5})$.

(c) From step (b) a precise measure of the angular error at $\alpha_5$, in the X', Y', Z' system of FIG. 9 is provided but the value of $\alpha_5$ is still required. The value of $\alpha_5$ may be obtained by taking the sum of all of the $\Delta$alpha terms i.e. $\alpha_{1\text{-}2} + \alpha_{2\text{-}3} + \alpha_{3\text{-}4} + \alpha_{4\text{-}5}$. In the alternative, the cross product of ($-\vec{b_1}^u \times -\vec{b_5}^u$)) can be taken with the result leading to the magnitude and sine of $\alpha_5$. It then follows that an accurate solution for alpha$_{sol}$ is given by:

$$\alpha_{sol.} = \alpha_5 + K\alpha_{4\text{-}5} \quad (25)$$

(d) From steps (a), (b) and (c), above, the location of the accurate solution vector $\overrightarrow{-b_{sol}}$ in the X', Y', Z' system is obtained which is defined as being alpha$_{sol}$ degrees from the $\overrightarrow{-b_1}^u$ reference axis Y'. The $\overrightarrow{-b_{sol}}$ solution vector can now be transferred into the base X, Y, Z system of the industrial robot 10 shown in FIG. 5 by multiplying it by the 3×3 matrix which defines the location of the X', Y', Z' system relative to the base X, Y, Z coordinate system.

This matrix can be employed to produce $[\overrightarrow{-b_{sol}}]_{xyz}$ from which the precise set of Cartesian coordinates for point P3$_{sol}$ can be calculated from equations (17)–(19), and from these coordinates the final correct solutions for $\theta_1$, $\theta_2$ and $\theta_3$ can be obtained from equations (1), (2), and (3).

In accordance with a further important aspect of the present invention the above described truncation process may be substantially simplified and shortened by using only the K factor result in step (a), eliminating steps (b), (c) and (d) above, and executing the interpolation or projection process directly in the X, Y, Z coordinate system of FIG. 5 rather than first operating on the alpha angles in the X', Y', Z' system of FIG. 9. To provide the equivalent of the above described truncation process directly in joint space, the (N+1) iteration, corresponding to the fifth iteration in the above described example, must be taken. This fifth iteration provides a set of tentative joint angles $\theta 1_5$, $\theta 2_5$, and $\theta 3_5$ in exactly the same manner as the four previous iterations. The tentative sets of joints angles $\theta 1_4$, $\theta 2_4$ and $\theta 3_4$ and $\theta 1_5$, $\theta 2_5$, $\theta 3_5$, plus the K factor obtained in step (a) described above, are then employed directly to solve for the final $\theta 1_{sol}$, $\theta 2_{sol}$ and $\theta 3_{sol}$ joint angles. The projection equations used to provide these joint angles are as follows:

$$\theta 1_{sol.} = \theta 1_5 + K(\theta 1_5 - \theta 1_4) = \theta 1_5 K\Delta\theta 1_{4\text{-}5} \quad (27)$$

$$\theta 2_{sol.} = \theta 2_5 + K(\theta 2_5 - \theta 2_4) = \theta 2_5 + K\Delta\theta 2_{4\text{-}5} \quad (28)$$

$$\theta 3_{sol.} = \theta 3_5 + K(\theta 3_5 - \theta 3_4) = 3_5 + K\Delta\theta 3_{4\text{-}5} \quad (29)$$

Equations (27), (28) and (29) define the three joint angle solutions in exactly the same fashion as equation (25) defines the correct solution for alpha$_{sol}$. The solutions provided using this simplified method are virtually identical to those achieved through the full alpha interpolation procedure previously described. Comparable accuracy is attained because the joint angle changes are essentially linear with changes in alpha over the relatively small alpha$_{3\text{-}5}$ interpolation region.

In accordance with a further important aspect of the invention, some additional computation time may be saved with only a small sacrifice in accuracy by using what may be called a 4+ iteration method. This method is essentially the same as the method employed in connection with equations (27)–(29) above except that with the 4+ iteration method it is not necessary to complete the fifth iteration. In the 4+ iteration method the same accurate K value is obtained in accordance with step (a) described above, which serves to define the size of the error term for the last iteration value. In this connection it will be recalled that in order to obtain the K factor it is necessary to pursue the fifth iteration far enough to provide the $\overrightarrow{-b_5}$ vector so that the cross product of ($\overrightarrow{-b_4}^u \times \overrightarrow{-b_5}^u$) can be taken the result of which provides the absolute value of sine $\alpha_{4\text{-}5}$ as well as the polarity of $\alpha_{4\text{-}5}$, etc. However, in the 4+ iteration method the fifth iteration is not completed to provide a set of $\theta 1_5$, $\theta 2_5$ and $\theta 3_5$ values. Instead, the $\theta 1_4$, $\theta 2_4$ and $\theta 3_4$ values from the fourth iteration are employed as a measurement base. The projection equations used to provide the final $\theta 1_{sol}$, $\theta 2_{sol}$ and $\theta 3_{sol}$ joint angles are as follows:

$$\theta 1_{sol.} = 1_4 + K(\theta 1_4 - \theta 1_3) = 1_4 + K\Delta\theta 1_{3\text{-}4} \quad (30)$$

$$\theta 2_{sol.} = 2_4 + K(\theta 2_4 - \theta 2_3) = \theta 2_4 + K\Delta\theta 2_{3\text{-}4} \quad (31)$$

$$\theta 3_{sol.} = 3_4 + K(\theta 3_4 = \theta 3_3) = \theta 3_4 + K\Delta\theta 3_{3\text{-}4} \quad (32)$$

Extensive testing of the 4+ iteration method has shown that this method provides sufficient accuracy for industrial robot applications. In most instances, the $\Delta\theta 1_{3\text{-}4}$, $\Delta\theta 2_{3\text{-}4}$ and $\Delta\theta 3_{3\text{-}4}$ values were less than $\pm$ one encoder least significant bit for each axis, i.e. equal to or less than $\pm 0.01°$ for all three joints. In such instances there was no need to truncate and apply equations (30)–(32) and the joint angle values resulting from the fourth iteration are employed to move the manipulator arm to the desired position corresponding to the T6 transform input signal. For the small percentage of cases which fail to converge within the N=4 iteration process, the 4+ truncation method yielded solutions for $\theta 1_{sol}$, $\theta 2_{sol}$ and $\theta 3_{sol}$ which were accurate to approximately $\pm 1$ encoder least significant bit in each axis.

As discussed generally heretofore, the rapidly converging iterative process of the present invention is initiated by using the old set of joint values $\theta_1$, $\theta_2$, and $\theta_3$ in computing the first iteration in responsive to the new T6 input signal to arrive at the first set of tentative new joint angles $\theta 1_1$, $\theta 2_1$ and $\theta 3_1$. Accordingly, the coordinate conversion process of the present invention functions properly with all real time conversion operations wherein the new input T6 transforms corresponds to a location close to the previous point to which the end effector has just been moved. This is true during teaching operations as well when a series of closely spaced interpolation points are produced in Cartesian coordinates for movement along one of the world coordinate axes because the encoders always provide the actual $\theta_1$, $\theta_2$ and $\theta_3$ values of the position of the arm when this real time teaching operation is initiated. However, during planning operations which are carried out off line, a series of T6 transform input signals may be provided in accordance with a computer derived series of moves in which the points may be spaced relatively far apart. In such a planning operation it is necessary to convert the given T6 input signals into corresponding joint angles in order to see how the joint angles change during the proposed series of moves and to be sure that angular velocities and joint angle limits are not exceeded.

While it would be possible to simulate the real time move between two proposed planning points which are far apart, such a procedure would be very time consuming and involve a large number of computations. For example, if the two points were spaced ten feet apart and a real time move is simulated in which 1,000 interpolation points are required for the ten foot move, a series of 4,000 interations would be required using the 4+ iteration method of the present invention in order to arrive at the correct joint angles corresponding to the T6 input signal which represents a position 10 feet away.

In accordance with an important aspect of the present invention a T6 input signal which corresponds to a point several feet away from the previous point can be quickly converted to the corresponding joint angles without providing intermediate interpolation points. More particularly, the point P5 corresponding to the new T6 input signal is calculated from equation (7) and the assumption is made that point P3 on the manipulator arm is positioned at the new point P5. This places point P3 at the origin of the $\vec{A6}$ vector locus circle instead of being on the circle periphery as shown in FIG. 9, but since the link b is relatively short as compared to the length of the link a2, this assumption makes possible the calculation of an initial $\vec{a2}^u$ vector which is relatively close to the desired final value so that the process will converge within a relatively small number of iterations.

Thus, the Cartesian coordinates x5, y5 and z5 of the point P5 corresponding to the new T6 input signal are substituted for the x3, y3, and z3 values of equations (1), (2) and (3) to obtain a set of synthetic old joint angles which may be termed $\theta1_{old}, \theta2_{old}$ and $\theta3_{old}$. These synthetic joint angles are then employed in equations (9)–(14) and equation (20) to provide an initial $\vec{a2}^u$ vector so that an initial $\pm\vec{b}$ vector can be obtained from equation (16) which is then substituted in equations (17)–(19) to get the coordinate values $X3_1$, $Y3_1$, $Z3_1$ which are then employed in equations (1), (2) and (3) to obtain the first tentative set of joint angles $\theta1_1$, $\theta2_1$ and $\theta3_1$ for the first iteration of the converging process. During these calculations it is again assumed that the configuration state for the target arm position will be the same as the configuration of the source position i.e., the "flip" configuration ($-\vec{b}^u$) or the "no-flip" configuration ($+\vec{b}^u$). Since the synthetic joint angles ($\theta1_{old}$, $\theta2_{old}$ and $\theta3_{old}$) can have a much greater error than during the real time coordinate conversion process, a greater number of iterations is allowed for convergence of the process. The iterations may be continued until the change in joint angles between the last two iterations is less than one least significant encoder bit in all axes. In the alternative, a truncation process similar to the 4+ iteration method described in detail heretofore may be employed. It has been found that during a planning mode an 8+ iteration method is sufficient to provide the desired joint angles corresponding to the given T6 input signal with resonable accuracy.

While there have been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a programmable manipulator of the type having a manipulator arm which is movable in three primary axes defining joint angles $\theta_1$, $\theta_2$ and $\theta_3$ and includes an outermost link and a manipulator hand which is connected to said outermost link a2 and is movable in three secondary axes, said manipulator hand including a fixed offset b between two of said secondary axes, the method of moving said manipulator arm in response to an input signal representing a desired position and orientation of said manipulator hand, said input signal being in the form of a matrix which includes a column vector A6 representing the approach orientation direction of said manipulator hand and a column vector representing the Cartesian coordinates of said desired position of said manipulator hand, which includes the steps of,
   a. reading the final joint angle value $\theta_1$, $\theta_2$ and $\theta_3$ from the previous command signal,
   b. approximating a direction vector a2 corresponding to the direction of said outermost link utilizing the final joint angle values $\theta_1$, $\theta_2$ and $\theta_3$ from said previous command signal,
   c. computing the vector cross product of said direction vector a2 and said approach vector A6 to obtain a b unit vector corresponding approximately to the direction of said fixed offset,
   d. multiplying said b unit vector by the length of said fixed offset to obtain a product corresponding to the magnitude and direction of said b vector in space,
   e. obtaining a tentative value for the position of the end of said outermost link by combining said obtained product with a position corresponding to the intersection of the two outermost ones of said secondary axes,
   f. computing a set of tentative joint angles $\theta_1$, $\theta_2$ and $\theta_3$ for said three primary axes from said tentative value end of outermost link position,
   g. computing from said set of tentative joint angles a more accurate direction vector a2,
   h. iterating steps (c) to (g) inclusive to obtain successive sets of more accurate intermediate joint angles for said three primary axes,
   i. terminating said iteration of steps (c) to (g) when the last two sets of tentative joint angles so produced are within a predetermined amount of each other, and
   j. rotating said three primary arm axes to the joint angles corresponding to said last set of tentative joint angles so produced, thereby to position said manipulator hand at said desired position and orientation.

2. The method of claim 1, wherein said manipulator arm is successively moved to a series of desired positions in response to successive ones of said input signals, and said last set of tentative joint angles produced in response to one of said input signals is employed to determine said first approximate direction vector a2 (step a.) for the next input signal.

3. The method of claim 1, which includes the steps of, assuming a set of joint angles for said three primary axes, and deriving said first approximation direction vector a2 from said set of assumed joint angles.

4. The method of claim 3, wherein said manipulator arm is successively moved to a series of desired positions in response to successive ones of said input signals, and said last set of tentative joint angles produced in response to one of said input signals is employed as said set of assumed joint angles for the next input signal.

5. The method of claim 3, wherein said set of assumed joint angles is derived from the Cartesian coordinates of said intersection of said two outermost ones of said secondary axes.

6. The method of claim 1, wherein said tentative value for the position of said end of said manipulator arm has a first value corresponding to the addition of said b unit vector position to said intersection position and a second value corresponding to the subtraction of said b unit vector from said intersection position, and said method includes the steps of comparing each of said first and second values to a previously determined position of said end of said manipulator arm and utilizing that one of said first and second values which is closest to said previously determined position to determine said set of tentative joint angles.

7. The method of claim 1, which includes measuring the movement of said manipulator arm in said three primary axes by encoders having a predetermined smallest increment of measurement, and terminating said iteration steps (b) to (f) when the difference between said last two sets of tentative joint angles is less than twice said predetermined smallest increment of said encoders.

8. In a programmable manipulator of the type having a manipulator arm which is movable in three primary axes defining joint angles $\theta_1$, $\theta_2$ and $\theta_3$ and includes an outermost link a2 and a manipulator hand which is connected to said outermost link and is movable in three secondary axes, said manipulator hand including a fixed offset between two of said secondary axes, the method of moving said manipulator arm in response to an input signal representing a desired position and orientation of said manipulator hand, said input signal being in the form of a matrix which includes a column vector A6 representing the approach orientation direction of said manipulator hand, and a column vector representing the Cartesian coordinates of said desired position of said manipulator hand, which includes the steps of, a. reading the final joint angle values $\theta_1$, $\theta_2$ and $\theta_3$ from the previous command signal, b. approximating a direction vector a2 corresponding to the direction of said outermost link utilizing the final joint angles $\theta_1$, $\theta_2$ and $\theta_3$ from said previous command signal, c. computing the vector cross product of said direction vector a2 and said approach vector A6 to obtain a b unit vector corresponding approximately to the direction of said offset, d. multiplying said b unit vector by the length of said fixed offset to obtain a product corresponding to the magnitude and direction of said b vector in space, e. obtaining a tentative value for the position of the end of said outermost link by combining said obtained product with a position corresponding to the intersection of the two outermost ones of said secondary axes, f. computing a set of tentative joint angles for said three primary axes from said tentative value end of outermost link position, g. computing from said set of tentative joint angles $\theta_1$, $\theta_2$ and $\theta_3$ a more accurate direction vector a2, h. iterating steps (c) to (g) inclusive to obtain successive sets of tentative joint angles, i. terminating said iteration of steps (c) to (g) after a predetermined number of iterations, j. utilizing the last two sets of tentative joint angles so produced to determine the exact joint angles for said three primary axes corresponding to said Cartesian coordinate representing column vector of said input signal, and k. rotating said three primary arm axes to said exact joint angles, thereby to position the end of said arm at said desired position.

9. In a programmable manipulator of the type having a manipulator arm which is a movable in three primary axes defining joint $\theta_1$, $\theta_2$ and $\theta_3$ and includes an outermost link a2 and a manipulator hand which is connected to said outermost link and is movable in three secondary axes, said manipulator hand including a fixed offset b between two of said secondary axes, the method of moving said manipulator arm in response to an input signal representing a desired position and orientation of said manipulator hand, said input signal being in the form of a matrix which includes a column vector A6 representing the approach orientation direction of said manipulator hand and a column vector representing the Cartesian coordinates of said desired position of said manipulator hand, which includes the steps of, a. reading the final joint angle values $\theta_1$, $\theta_2$ and $\theta_3$ from the previous command signal, b. approximately a direction vector a2 corresponding to the direction of said outermost link utilizing the final joint angle values $\theta_1$, $\theta_2$ and $\theta_3$ from said previous command signal, c. computing the vector cross product of said direction vector a2 and said approach vector A6 to obtain a b vector corresponding approximately to the direction of said offset, d. multiplying said b unit vector by the length of said fixed offset to obtain a product corresponding to the magnitude and direction of said b vector in space, e. obtaining a tentative value for the position of the end of said outermost link by combining said obtained product with a position corresponding to the intersection of the two outermost ones of said secondary axes, f. computing a set of tentative joint angles $\theta_1$, $\theta_2$ and $\theta_3$ for said three primary axes from said tentative value end of outermost link position, g. computing from said set of tentative joint angles a more accurate direction vector a2, h. iterating steps (c) to (g) inclusive to obtain successive sets of tentative joint angles, i. terminating said iteration of steps (c) to (g) after a predetermined number of iterations, j. rotating said three primary axes to the joint angles corresponding to the last set of tentative joint angles if the difference between the last two sets of tentative joint angles is less than a predetermined amount, and k. utilizing said last two sets of tentative joint angles to determine the exact joint angles for said three primary axes corresponding to said Cartesian coordinate representing column vector of said input signal when said difference is greater than said predetermined amount and then rotating said three primary axes to said determined exact joint angles.

10. The method of claim 9, which includes the step of measuring movement of said manipulator arm in said three primary axes by encoders having a predetermined smallest increment of measurement, and said predetermined amount is equal to said predetermined smallest increment.

11. The method of claim 9, wherein said step of determining said exact joint angles includes the step of determining a damping factor $X = \alpha 4-5/\alpha 3-4$; where $\alpha 4-5$ is the angle between the b unit vector obtained by the 4th and 5th iterations of step (b) and $\alpha_{3\text{-}4}$ is the angle between the b unit vectors obtained by the 3rd and 4th iterations of step (b).

12. The method of claim 11, which includes the steps of utilizing said damping factor X to determine a proportionality factor $K = X/3 - X$, and utilizing said proportionality factor K to determine said exact joint angles.

13. In a programmable manipulator of the type having a manipulator arm which is movable in three primary axes and includes an outermost link and a manipulator hand which is connected to said outermost link and is movable in three secondary axes, said manipulator hand including a fixed offset between two of said secondary axes, the method of moving said manipulator arm in response to an input signal representing a desired position and orientation of said manipulator hand, said input signal being in the form of a matrix which includes a column vector A6 represent the approach orientation direction of said manipulator hand, and a column vector representing the Cartesian coordinates of said desired position of said manipulator hand, which includes the steps of, a. approximating a direction vector a2 corresponding to the direction of said outermost link, b. computing the vector cross product of said direction vector a2 and said approach vector A6 to obtain a b unit vector corresponding approximately to the direction of said offset, c. multiplying said b unit vector by the length of said fixed offset to obtain a product corresponding to the magnitude and direction of said b vector in space, d. obtaining a tentative value for the position of the end of said outermost link by combining said obtaining product with a position corresponding to the intersection of the two outermost ones of said secondary axes, e. computing a set of tentative joint angles for said three primary axes from said tentative value end of outermost link position, f. computing from said set of tentative joint angles a more accurate direction vector $a_2$, g. iterating steps (b) to (f) inclusive to obtain successive sets of tentative joint angles, (h) terminating said iteration of steps (b) to (f) after five such iterations, (i) determining a damping factor $X = \alpha_{4\text{-}5}/\alpha_{3\text{-}4}$ where $\alpha_{4\text{-}5}$ is the angle between the b unit vectors obtained by the 4th and 5th iterations of step (b) and $\alpha_{3\text{-}4}$ is the angle between the b unit vectors obtained by the 3rd and 4th iterations of step (b), (j) utilizing said damping factor X to determine a proportionality factor $K = X/1 - X$, (k) determining the exact joint angles ($\theta$sol.) for said three primary axes corresponding to said Cartesian coordinate representing column vector of said input signal in accordance with the relationship $\theta_{sol.} = \theta_5 + K\theta_{4\text{-}5}$, where $\theta_5$ is the set of tentative joint angles obtained by said 5th iteration and $\theta_{4\text{-}5}$ is the change in the set of tentative joint angles which occurs between said 4th iteration and said 5th iteration, and (l) rotating said three primary axes to said determined exact joint angles.

14. In a programmable manipulator of the type having a manipulator arm which is movable in three primary axes and includes an outermost link and a manipulator hand which is connected to said outermost link and is movable in three secondary axes, said manipulator hand including a fixed offset between two of said secondary axes, the method of moving said manipulator arm in response to an input signal representing a desired position and orientation of said manipulator hand, said input signal being in the form of a matrix which includes a column vector A6 represent the approach orientation direction of said manipulator hand and a column vector representing the Cartesian coordinates of said desired position of said manipulator hand, which includes the steps of, a. approximating a direction vector a2 corresponding to the direction of said outermost link, b. computing the vector cross product of said direction vector a2 and said approach vector A6 to obtain a b unit vector corresponding approximately to the direction of said offset, c. multiplying said b unit vector by the length of said fixed offset to obtain a product corresponding to the position and orientation of said b vector in space, d. obtaining a tentative value for the position of the end of said outermost link by combining said obtained product with a position corresponding to the intersection of the two outermost ones of said secondary axesm e. Computing a set of tentative joint angles for said three primary axes from said tentative value end of outermost link position, f. computing from said set of tentative joint angles a more accurate direction vector $a_2$, g. iterating steps (b) to (f) inclusive to obtain successive sets of tentative joint angles, (h) terminating said iteration of steps (b) to (f) after four such iterations;

(i) performing a further step (b) to obtain a fifth b unit vector, (j) computing a damping factor X which is equal to the ratio of the change in angle from the fourth b unit vector to the fifth b unit vector to the change in angle from the third b unit vector to the fourth b unit vector;

(k) utilizing said damping factor X to determine a proportionality factor $K = X/1 - X$;

(l) determining the exact joint angles ($\theta$sol.) for said three primary axes corresponding to said Cartesian coordinate representing column vector of said input signal in accordance with the relationship $\theta_{sol.} = \theta_4 + K\theta_{4\text{-}5}$, where $\theta_4$ is the set of tentative joint angles obtained by said fourth iteration and $\theta_{4\text{-}5}$ is the change in the set of tentative joint angles which occurs between the fourth and fifth iterations; and (m) rotating said three primary axes to said determined exact joint angles.

15. In a programmable manipulator of the type having a manipulator arm which is movable in three primary axes and includes an outermost link and a manipulator hand which is connected to said outermost link and is movable in three secondary axes, said manipulator hand including a fixed offset between two of said secondary axes, the method of moving said manipulator arm in response to an input signal representing a desired position and orientation of said manipulator hand, said input signal being in the form of a matrix which includes a column vector A6 representing the approach orientation direction of said manipulator hand and a column vector representing the Cartesian coordinates of said desired position of said manipulator hand, which includes the steps of,
 a. approximating the direction vector a2 corresponding to the direction of said outermost link,
 b. computing the vector cross product of said direction vector a2 and said approach vector A6 to obtain a b unit vector corresponding approximately to the direction of said offset,
 c. multiplying said b unit vector by the length of said fixed offset to obtain a product corresponding to the magnitude and direction of said b vector in space,
 d. obtaining a tentative value for the position of the end of said outermost link by combining said obtained product with a position corresponding to the intersection of the two outermost ones of said secondary axes,
 e. computing a set of tentative joint angles for said three primary axes from said tentative value end of outermost link position,
 f. computing from said set of tentative joint angles a more accurate direction vector $a_2$,
 g. iterating steps (b) to (f) inclusive to obtain successive sets of more accurate intermediate joint angles for said three primary axes,
 h. truncating said iteration steps (b) to (f) after a predetermined number of iterations,
 i. interpolating the final values for the joint axes from the data obtained during the iteration.

* * * * *